C. A. PARSONS, S. S. COOK & L. M. DOUGLAS.
MEANS FOR DETERMINING THE RELATIVE ANGULAR VELOCITY AND PHASE OF REVOLVING BODIES.
APPLICATION FILED DEC. 13, 1915.
1,207,072.  Patented Dec. 5, 1916.
3 SHEETS—SHEET 3.
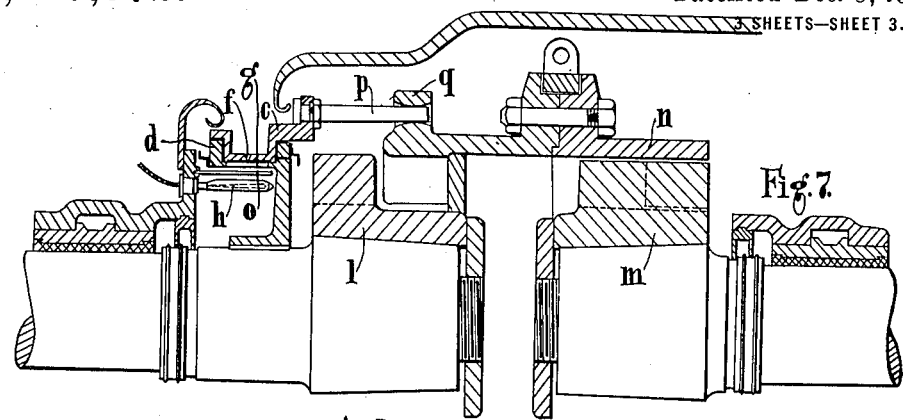
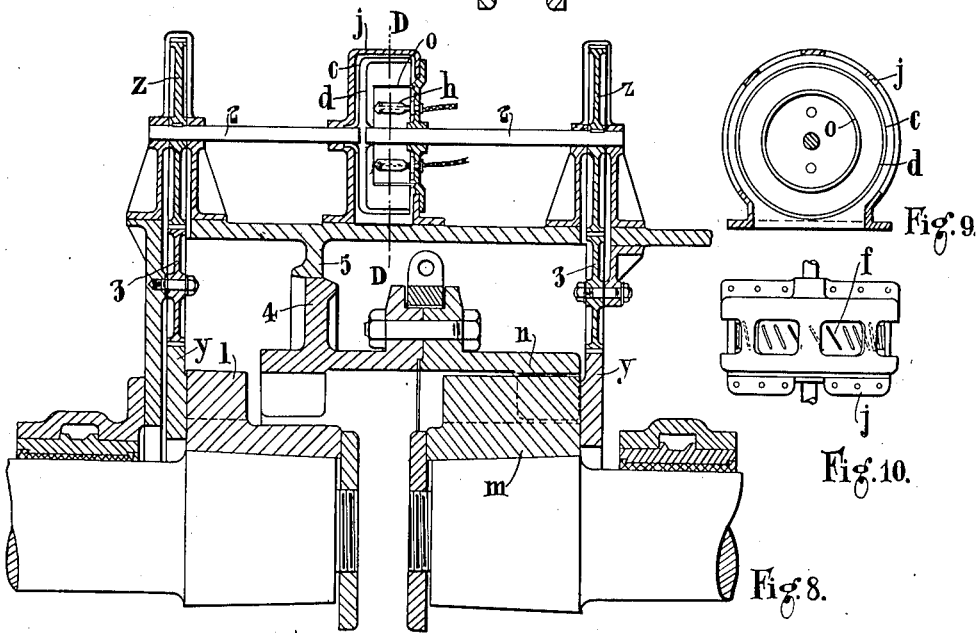
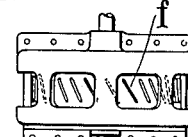
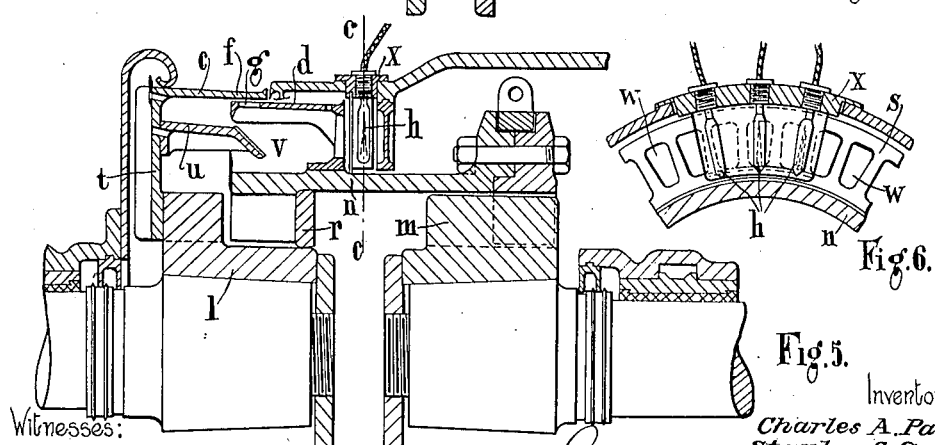

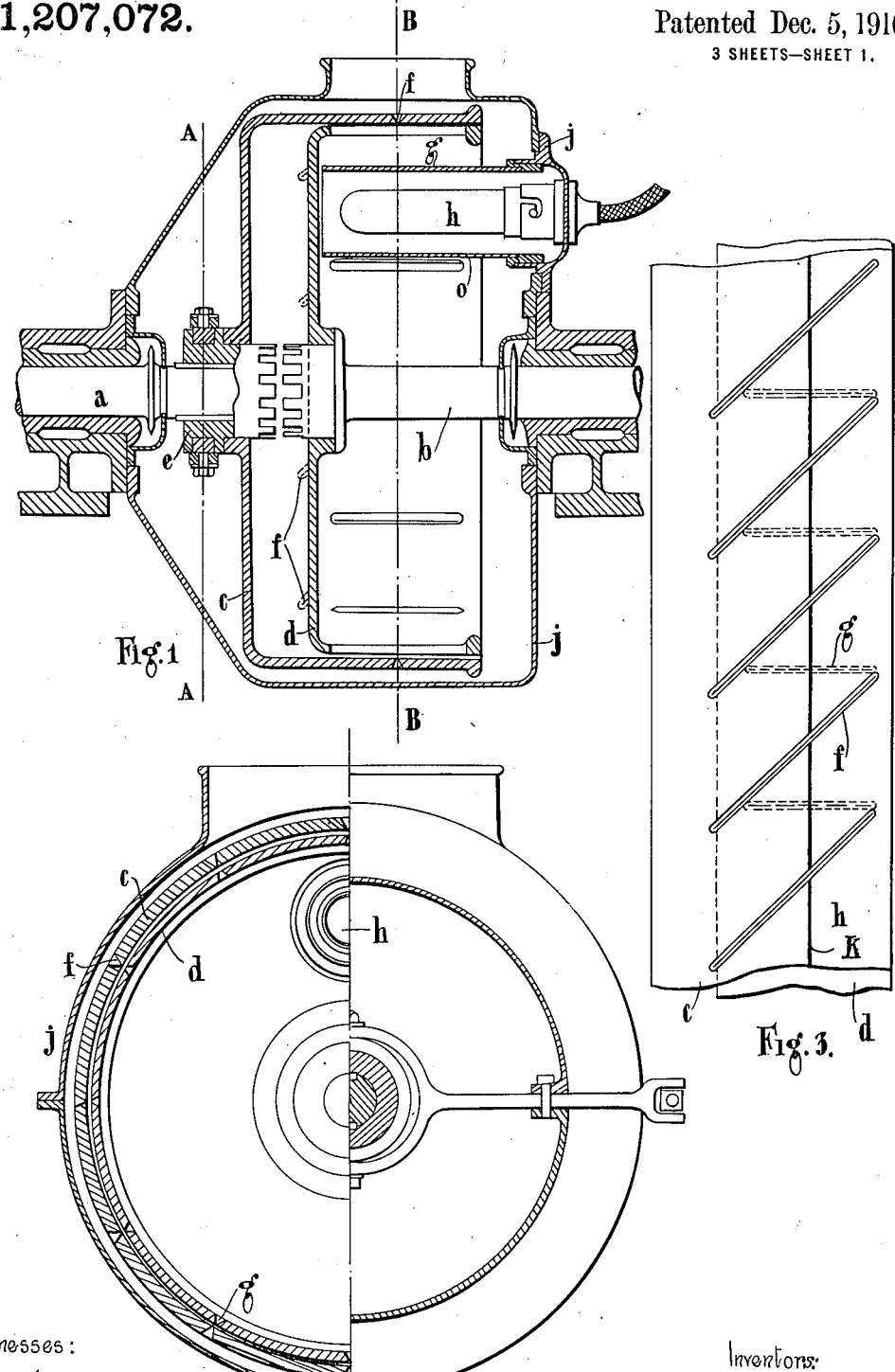

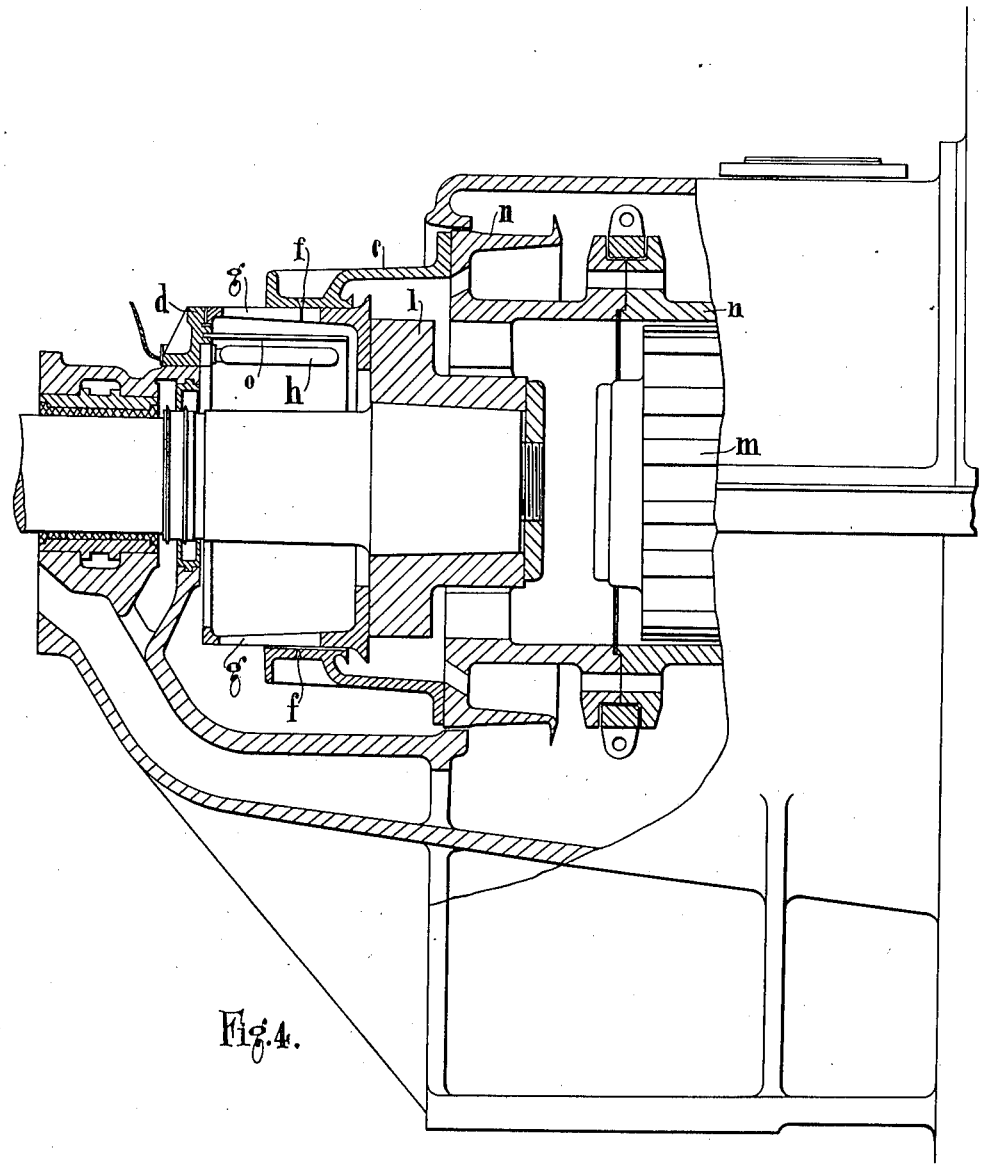

UNITED STATES PATENT OFFICE.

CHARLES ALGERNON PARSONS, STANLEY SMITH COOK, AND LOUIS MORTIMER DOUGLAS, OF WALLSEND, ENGLAND; SAID COOK AND DOUGLAS ASSIGNORS TO SAID PARSONS.

MEANS FOR DETERMINING THE RELATIVE ANGULAR VELOCITY AND PHASE OF REVOLVING BODIES.

1,207,072.  Specification of Letters Patent.  Patented Dec. 5, 1916.

Application filed December 13, 1915. Serial No. 66,668.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, residing at Turbinia Works, Wallsend, in the county of Northumberland, England, have invented certain new and useful Improvements in and Relating to Means for Determining the Relative Angular Velocity and Phase of Revolving Bodies, of which the following is a specification.

The present invention relates to means for determining the relative angular velocity and phase of revolving bodies, and relates more particularly to devices of this nature of the type in which slotted elements rotated by the revolving bodies are arranged so that light from a suitable source can pass through the intersections of the slots.

The object of the present invention is to provide devices of the type indicated which shall be suitable among other uses for directly mounting upon the revolving bodies while providing a convenient and easily inspected indication of the relative speed and phase.

The present invention consists in a device of the type indicated in which the slotted elements are formed as concentric cylinders or concentric cones, the slots in the respective cylinders or cones being relatively inclined, making different angles with the axis of rotation in the different cylinders or cones.

The invention also consists in the combination of a device for determining relative angular velocity and phase embodying the present invention with a claw coupling.

The invention further consists in the improved devices for determining the relative angular velocity and phase of revolving bodies hereinafter described.

Referring to the accompanying drawings:—Figure 1 is a sectional elevation through a simple form of device embodying the present invention; Fig. 2 is a sectional view of Fig. 1, taken on two planes, the right half on the plane A—A, the left half on the plane B—B of Fig. 1; Fig. 3 is a developed view of the peripheries of the two slotted cylinders; Fig. 4 shows the combination of a device according to the present invention with a claw coupling; Fig. 5 illustrates a further form in which a substantially conical mirror is employed to throw light from a suitable source through the slotted members; Fig. 6 a detail section on the line C—C of Fig. 5; Fig. 7 illustrates a further form in which the outer slotted cylindrical member is driven by sliding pins from the coupling sleeve in order to avoid axial movement of the outer slotted member; Fig. 8 illustrates a form in which the slotted cylindrical members are rotated through gearing from the parts of the coupling to which they are respectively related; Fig. 9 is a sectional view on the line D—D of Fig. 8; while Fig. 10 is a plan view of the casing containing the slotted members.

In carrying the present invention into effect according to one form (see Figs. 1-3) and as applied, for example, to a pair of coaxial shafts $a$ and $b$ carrying claw couplings, two cylindrical or cup-shaped members $c$ and $d$ are provided. One of these members $c$ is attached to a coupling sleeve $e$ on one of the shafts $a$, the other member $d$ is attached to the other shaft $b$, and its diameter is such that its cylindrical portion can freely rotate within and preferably out of contact with the cylindrical portion of the first member $c$. In the cylindrical portions of both members slots or slits $f$, $g$ are provided. These slots are preferably formed with beveled edges. The slots $g$ in the inner member $d$ are formed parallel with the axis of rotation, while the slots $f$ in the outer member $c$ are inclined to the axis of rotation. Within the cylindrical portions of the slotted members a suitable source of light, for instance, an elongated bulb incandescent electric lamp $h$ is supported. It is to be understood that the source of light does not rotate with the cylindrical members, but is preferably supported upon a casing $j$ surrounding the cylindrical members and the claw coupling. Further, the source of light may be placed at any convenient distance and position and reflected from a mirror placed within the cylindrical portions of the slotted members as described later with reference to Fig. 5. In devices of the type to which this invention relates, when both slotted members are rotating with the same angular velocity, the light shines through the intersection of the two sets of slots and owing to persistence of vision forms a line of light. This line of light in devices according to the present invention extends around the periphery of the cylindrical members. In order to determine when the rotating bodies are in correct relative phase it is necessary to know the position of the line of light which corresponds to the correct phase. This position is determined when the bodies are at rest and in their proper relative positions, and this correct position of the line of light is indicated to the operator while the parts are rotating by means of a reference line of light formed by a series of apertures in the cylindrical portion of the slotted members, or by a line delineated upon the periphery of the outer cylindrical member as shown at $k$, Fig. 3, for example.

It will be seen that the slotted members may be both directly secured upon the two coaxial shafts or one may be secured upon one of the shafts while the other is secured upon a longitudinal sliding portion of the claw coupling, as shown in Figs. 1-6, or they may be rotated by gearing between them and the two members of the claw coupling respectively, as shown in Figs. 8-10, or driven at the same speed as the shafts by means of pins sliding in holes in one of the members, as shown in Fig. 7.

In carrying the present invention into effect according to a modified construction (see Fig. 4) as applied to a coupling of the type in which each of the shafts to be coupled carries claw members $l$, $m$ which are coupled by a clutch sleeve $n$, the outer slotted cylindrical member $c$ may conveniently be attached to the moving clutch sleeve $n$. The inner slotted cylindrical member $d$ is conveniently mounted by a flange upon the claw carrying piece $l$ of one of the shafts. The slots $g$ in this inner member are made parallel to the axis of rotation and considerably longer than the slots $f$ in the outer cylindrical member $c$ to allow for the longitudinal movement of the outer member over the inner when the clutch sleeve $n$ is operated.

In order to diffuse the light from the lamp $h$ or other source of light, it is desirable to interpose between the source of light and the inner periphery of the inner slotted member a curved screen $o$ of frosted glass or similar material.

In the modification shown in Fig. 5 the inner slotted member $d$ is carried on the coupling sleeve $n$ by means of a flange $s$. The outer slotted member $c$ is provided with an inturned flange $t$ by which it is attached to the member $l$. Upon the flange $t$ a ring $u$ with a beveled edge is mounted, the beveled edge being provided with a mirror $v$ which may be made up of a series of flat portions of mirror. The flange $s$ has apertures $w$ through which light from the lamps $h$ can fall on the mirror $v$ and be reflected through the intersections of the slots $g$, $f$. A diffuser $o$ may be held in the lamp casing $x$.

In the modification shown in Fig. 7 the outer slotted member $c$ does not move axially but is retained between shoulders upon the inner member $d$. One of the shoulders is made detachable for the purpose of assembling the parts. In this form the outer member $c$ is driven by pins $p$ carried by a flange. These pins engage holes in a flange $q$ on the sleeve $n$. The overhung portion of the sleeve $n$ in Figs. 5 and 7 may be supported by a flange $r$ sliding on the member $l$. Suitable holes and ducts lead oil to the contacting surfaces of $c$ and $d$.

In the modifications described with reference to Figs. 1-7, it is obvious that the cylindrical members rotate at the same speed as the members to which they are attached. It is therefore necessary in order to correctly indicate the relative phase that the number of slots in the slotted members should be either equal to the number of claws in the engaging portion of the coupling or a submultiple of this number. Or, if it is only required to clutch the shafts in one position only one slot is necessary in each member.

It is to be noted that in certain of the forms, for example, Fig. 7, the inclination of the two sets of slots may be reversed, that is to say, the outer set may be parallel with the axis of rotation while the inner set are inclined to the axis of rotation. Again, both sets of slots may be inclined to the axis of rotation, in which case it is desirable that the inclination be in the same sense, and it is a necessary condition that the inclination of one set of slots be greater than the inclination of the other in order that light from a suitable source may shine through the intersections of the lines and not through the entire length of the lines as would be the case if the inclinations were in the same sense and of the same degree. Further, if it is only required to clutch the shafts in one or two positions the circumferential pitch of the slots may be uneven, or a different number of uniformly pitched slots may be provided in each member.

Figs. 8-10 show a modification in which the sloted members are rotated by gearing from the two members $l$ and $m$ of the claw coupling. Pinions $y$ are provided on $l$ and $m$ and drive the wheels $z$ on the shafts 2 through the idler wheels 3. The sleeve $n$ is supported in the disengaged position by flanges 4 and 5.

In cases where the gearing is such as to rotate the members $c$ and $d$ at the same speed as $l$ and $m$, the number of slots may be made the same as the number of claws on

*l* and *m*, or a sub-multiple of this number. But where the speeds of *c d* and *l m* are not the same, the speed of *c d* should be made a multiple or sub-multiple of that of *l m*, and the number of slots varied to suit the relation between the speeds. In Fig. 8 the speed of *c d* is twice the speed of *l m*, and therefore the number of slots in *c d* can be half the number of claws in *l m*.

The constructions described lend themselves to a compact and simple arrangement and can conveniently be applied near the casing covering the coupling.

It will be understood that conical slotted members may be substituted for the cylindrical members referred to.

Although the particular applications described refer to the determination of angular velocity and phase of two shafts to be united by a coupling, the present invention is applicable to the synchronization of any two revolving bodies.

It will be seen that many modifications may be made in carrying out the present invention without departing from the spirit of the same.

We claim—

1. Means for determining the relative angular velocity and phase of two revolving bodies comprising two concentric cylinders provided with elongated apertures and rotated in the same direction, each by one of the bodies, the said apertures in the respective cylinders being relatively inclined, making different angles to the axis of rotation in the two cylinders, in combination with a source of light so arranged that light can pass through the intersections of the said apertures.

2. In means for determining the relative angular velocity and phase of two revolving bodies, in combination, two rotatable adjacent concentric cylinders, axial slots in one of said cylinders, slots in the other of said cylinders inclined to the axial direction, and means for causing light to pass through the intersections of said slots.

3. In means for determining the relative angular velocity and phase of two co-axial rotating shafts in combination, two concentric cylinders, elongated apertures in said cylinders so arranged that they progressively intersect on relative rotation of the cylinders, a source of light so arranged that light can pass through the intersections of said apertures, clutch means on the adjacent end of each of said shafts, means conveying rotary motion from one of said shafts to one of said cylinders and from the other of said shafts to the other of said cylinders.

4. In means for determining the relative angular velocity and phase of two co-axial shafts in combination, two concentric cylinders co-axial with said shafts, elongated apertures in each of said cylinders, the apertures in the respective cylinders being relatively inclined, a source of light so arranged that light can pass through the intersections of said apertures, clutch means on the adjacent ends of each of said shafts and in proximity to said cylinders, a sliding member adapted to connect and disconnect said clutch means, means adapted to connect one of said cylinders with one of said shafts and means adapted to connect the other of said cylinders with said sliding member.

5. Means for determining the relative angular velocity and phase of two revolving bodies comprising two concentric cylinders provided with elongated apertures and rotated in the same direction, each by one of the bodies, the said apertures in the respective cylinders being relatively inclined, making different angles to the axis of rotation in the two cylinders, in combination with a source of light so arranged that light can pass through the intersections of the said apertures, means conveying rotary motion from one of said bodies to one of said cylinders and from the other of said bodies to the other of said cylinders, said means comprising trains of toothed gearing.

6. In means for determining the relative angular velocity and phase of two co-axial shafts in combination, two concentric cylinders co-axial with said shafts, elongated apertures in each of said cylinders, the apertures in the respective cylinders being relatively inclined, a source of light so arranged that light can pass through the intersections of said apertures, clutch means on the adjacent ends of each of said shafts and in proximity to said cylinders, a sliding member adapted to connect and disconnect said clutch means, means adapted to connect one of said cylinders with one of said shafts and means adapted to connect the other of said cylinders with said sliding member, said means comprising pins carried by said last mentioned cylinder and adapted to slidingly engage holes in the said sliding member.

In testimony whereof, we have affixed our signatures.

CHARLES ALGERNON PARSONS.
STANLEY SMITH COOK.
LOUIS MORTIMER DOUGLAS.